June 7, 1960 O. E. ADLER 2,939,207
REINFORCING WIRE
Filed Oct. 4, 1956
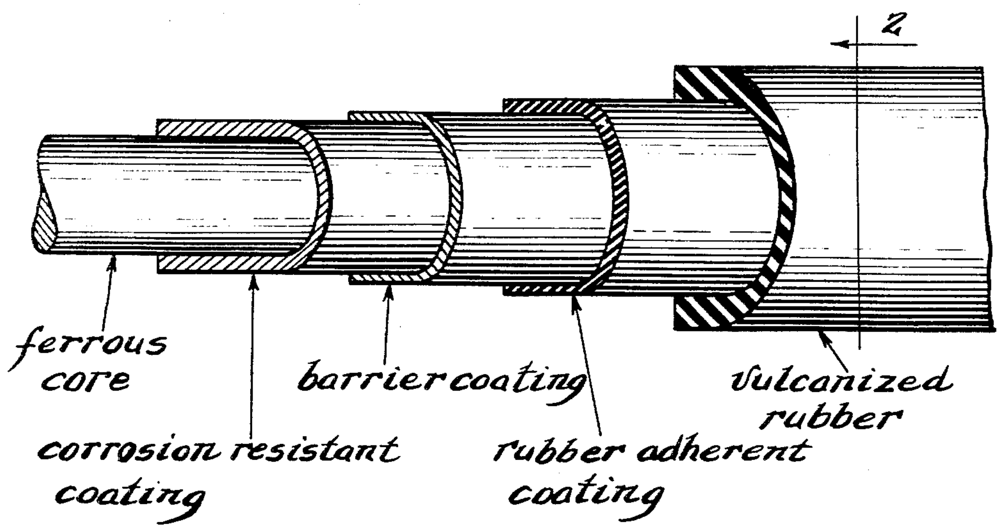
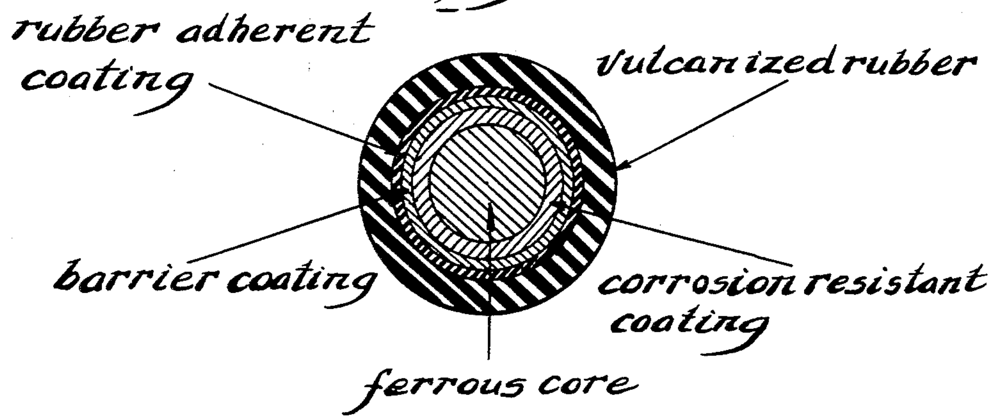
Inventor:
Orville E. Adler,
By Schroeder, Hofgren
Brady & Wegner. Attys.

United States Patent Office 2,939,207

Patented June 7, 1960

2,939,207

REINFORCING WIRE

Orville E. Adler, Niles, Mich., assignor to National-Standard Company, a corporation of Delaware Filed Oct. 4, 1956, Ser. No. 613,968

15 Claims. (Cl. 29—195)

This invention relates to a metal article designed for adherent vulcanization to rubber, an example of such a metal article being a reinforcing wire of the character used in tire beads. The application is a continuation-in-part of my copending application Serial Number 355,041, filed May 14, 1953, now abandoned.

It has previously been suggested that tire bead reinforcing wires, or similar articles to which rubber is to be adhered by vulcanization, be made corrosion resistant by coating with zinc, and then made adherent to rubber by coating with copper. Domm Patent 2,002,263 discloses such an article. In addition to zinc, cadmium and tin are also suitable corrosion resistant coatings for this purpose. The thickness of copper for adherence purposes is normally less than about one sixty-thousandth inch (.000017), and normally it is not less than $\frac{1}{240,000}$ inch (.00000416). In addition to copper, adequate rubber adhesion may be obtained by copper-zinc alloys, copper-cadmium alloys, and copper-tin alloys containing certain ranges of zinc to copper, cadmium to copper, or tin to copper.

Practical experience with rubber adherent wires which include a zinc coating with a copper coating on the zinc prove that under some conditions, particularly during long storage or under unfavorable conditions of heat or temperature in storage, wires produced in this manner lose their ability to adhere adequately to rubber when it is vulcanized to the wire, and this has created a substantial problem in the marketing of such wires, particularly their export.

Reinforcing wire may be provided with rubber adherence at least equal to the previous wire, and which also has the ability to stand long storage periods or extraordinary atmospheric conditions, by providing a thin barrier coating between the corrosion resistant coating and the rubber adherent coating. Such a barrier coating may consist of nickel, cobalt or antimony.

Thus, the basic requirements for a suitable rubber reinforcing wire are a ferrous metal base, a corrosion resistant coating on the base which may be zinc, cadmium or tin, a thin barrier coating on the corrosion resistant coating which may be nickel, cobalt or antimony, and a rubber adherent metallic coating on the barrier coating which may be copper, or certain selected copper-zinc alloys, copper-cadmium alloys, or copper-tin alloys.

Using as little as .000001 inch of a barrier metal between the corrosion resistant coating and the rubber adherent coating produces an extraordinary increase in shelf life of the wire insofar as retention of rubber adherence is concerned. For example, under accelerated aging tests at 400° F. an iron-zinc-copper wire loses its ability to adhere to rubber on vulcanization, in as little as ten to fifteen minutes, whereas a wire with a thin nickel coating between zinc and copper still will adhere to rubber upon vulcanization after twelve hours of such a heat treatment. However, the presence of such a barrier coat does not reduce the rubber adherence.

The invention is illustrated diagrammatically in the drawings in which:

Fig. 1 is a longitudinal broken view of a wire cut away to show the various coatings; and Fig. 2 is a section taken along the line 2—2 of Fig. 1.

It is to be understood that the drawing is greatly enlarged, and the various coatings are out of scale.

As illustrated in the drawings, the wire has a ferrous metal core on top of which is a corrosion resistant coating; on this layer is a thin barrier coating; and there is an external rubber adherent coating to which rubber is vulcanized. The invention is referred to herein particularly as applied to tire bead reinforcing wires, but it is obvious that it is applicable to any situation in which metal is to be imbedded in rubber by vulcanization for use as a reinforcing member.

Normal tire bead reinforcing wires are from .037 to .043 inch in diameter. They are first cleansed and then provided with a corrosion resistant coating in any suitable manner. Any of the corrosion resistant coatings may be applied either by hot dipping or by electrodeposition. Hot dipping is preferable because it produces a slight alloying of the corrosion resistant coating with the ferrous core which provides a stronger bond between the two. In any case the wire is first cleansed in a suitable way.

For hot dipping in any one of the three corrosion resistant coatings, the wire is immersed from 1 to 5 seconds in a molten metal bath which is preferably maintained at a temperature between 820° and 840° F. which leaves a corrosion resistant metal coating approximately $\frac{1}{4,000}$ to $\frac{1}{11,000}$ of an inch thick. With a .043 diameter wire which weighs about 4.88 lbs. per 1000 feet of wire, the weight of corrosion resistant metal is about 8 to 20 grams per kilogram of wire. With .037 wire, weighing about 3.61 lbs. per 1000 feet, the weight of corrosion resistant metal is about 10 to 24 grams per kilogram.

Zinc and cadmium are preferred to tin, because they provide an electro-positive coating which acts electrolytically to protect the ferrous base even though the coating is not complete. Tin provides excellent mechanical protection if the surface is complete, but not otherwise. Cadmium is chemically somewhat better than zinc, but for economic reasons zinc is preferred.

Any electroplating method which will provide a firmly adherent coating of any one of the enumerated corrosion resistant metals on a ferrous metal base may be used instead of hot dipping to plate the wire with a coating of sufficeint thickness to afford adequate corrosion protection to the wire.

After the corrosion resistant coating is applied, the wire is preferably electro-cleaned in a sodium cyanide-caustic soda bath; for example, with 2 ounces each of these ingredients per gallon of solution. The wire is then washed in water prior to being provided with a barrier coating.

A suitable bath for applying a nickel barrier coating is as follows:

Nickel Plating Bath:

| | |
|---|---|
| Solution concentrations— | |
| Nickel Sulphate | 105 g./l. |
| Sodium Chloride | 27 g./l. |
| Boric Acid | 69 g./l. |
| Sodium Sulphate | 146 g./l. |
| Sodium Carbonate | to pH of 5.6. |
| Operating conditions— | |
| Temperature | 130° F. |
| Current density | 25 to 100 amps./sq. ft. |

At 50 amps, per sq. ft., using a 4 second plating time, the thickness is about .000002 inch, or roughly about $\frac{1}{10}$ gram per kilogram of wire. Obviously the minimum coating heretofore referred to, which is about half that thickness, may be applied in about 2 seconds.

The plating time may be varied from the minimum of 2 seconds upward, but it is preferred not to use above about 8 seconds in a higher current density treatment because above this range the cost of the nickel is unnecessarily high.

A suitable arrangement for providing the wire with a cobalt barrier coating is as follows:

Cobalt Plating Bath:

| | |
|---|---|
| Solution concentrations— | |
| Cobalt Sulphate | 504 g./l. |
| Sodium Chloride | 17 g./l. |
| Boric Acid | 45 g./l. |
| Sulphuric Acid | 9.8 g./l. |
| Operating conditions— | |
| Temperature | room. |
| Current density | 35–160 amps./sq. ft. |

The plating time for cobalt is the same as for nickel, and the minimum thickness is about the same.

A barrier coating of antimony may be applied to the wire by displacement under the following conditions:

Antimony Displacement Bath:

| | |
|---|---|
| Solution concentrations— | |
| Antimony Trisulphide | 30 g./l. |
| Sodium Cyanide | 83 g./l. |
| Sodium Hydroxide | 75 g./l. |
| Operating conditions— | |
| Temperature | room temp. to 160° F. |
| Immersion time | 3–12 seconds. |

The stated immersion time provides an antimony coating of about the same thickness as the nickel barrier coating.

After the barrier coating is applied, the wire is washed and then provided with a rubber adherent coating of copper, a copper-zinc alloy, a copper-tin alloy, or a copper-cadmium alloy. For copper plating a copper cyanide bath at about 150° F. is preferred. The copper content may be about 45 grams per liter, and the cyanide about 12 grams per liter with the pH highly alkaline. A 4 second plating time at 100 amps. per sq. ft. in such a bath is satisfactory. If the thickness of the copper much exceeds $\frac{1}{60,000}$ of an inch, adherence is interfered with.

A suitable bath for applying a brass rubber adherent coating to the barrier coating is as follows:

Brass Plating Bath:

| | |
|---|---|
| Solution concentrations— | |
| Copper Cyanide | 42 g./l. |
| Zinc Cyanide | 54 g./l. |
| Sodium Cyanide | 60 g./l. |
| Sodium Carbonate | 30 g./l. |
| Ammonium Hydroxide | 0.8 cc./l. |
| Operating conditions— | |
| Temperature | 130° F. |
| Current density | 100 amps./sq. ft. |

Suitable conditions for the application of a bronze rubber adherent coating to the barrier coating are as follows:

Bronze Plating Bath:

| | |
|---|---|
| Solution concentrations— | |
| Copper Cyanide | 70 g./l. |
| Potassium Stannate | 124 g./l. |
| Potassium Cyanide | 85 g./l. |
| Potassium Hydroxide | 5 g./l. |
| Operating conditions— | |
| Temperature | 150° F. |
| Current density | 200 amps./sq. ft. |

For proper adhesion of rubber to brass, it is necessary that the alloy be from 60 to 80% copper, balance zinc; and the optimum is 70% copper. A suitable brass layer is about the same thickness as a suitable copper layer, but there is not as serious interference with rubber adherence if a thicker brass layer is used.

Optimum conditions for a copper-cadmium alloy are about 70% copper, balance cadmium; and substantially the same leeway on composition and on coat thickness exist as for brass.

A suitable range of tin in a copper-tin alloy for rubber adherence is from a minimum of about 1% tin to a maximum of about 30%.

The finished wire with its combination of a corrosion resistant coating, a barrier coating and a rubber adherent coating may be stored for substantially any length of time under any conditions which would normally be encountered in storage, and when the wire is to be used in a vulcanizing process its rubber adherence is unimpaired and it may be adhered to the rubber in any suitable vulcanizing process.

If desired the various plating operation may be performed on relatively heavy wire, in the manner disclosed in Kenmore Patents 2,495,695 and 2,680,710, and the wire may be drawn to any desired size after plating.

The foregoing detailed description is given for clearness of understanding only and no unnecessary limitations are to be understood therefrom, as some modifications will be obvious to those skilled in the art.

I claim:

1. An article for adherent vulcanization to rubber, comprising: a ferrous metal base; a corrosion resistant coating on said base including predominantly a metal of the group consisting of zinc, cadmium and tin; a thin barrier coating on said corrosion resistant coating of a metal of the group consisting of nickel, cobalt and antimony; and a rubber adherent metallic coating on said barrier coating of the group consisting of copper, copper-zinc alloys, copper-cadmium alloys, and copper-tin alloys.

2. An article for adherent vulcanization to rubber, comprising: a ferrous metal base; a corrosion resistant coating on said base consisting predominantly of zinc; a thin barrier coating on said corrosion resistant coating of a metal of the group consisting of nickel, cobalt and antimony; and a rubber adherent metallic coating on said barrier coating of the group consisting of copper, copper-zinc alloys, copper-cadmium alloys, and copper-tin alloys.

3. An article for adherent vulcanization to rubber, comprising: a ferrous metal base; a corrosion resistant coating on said base consisting predominantly of zinc; a thin barrier of coating of nickel on said corrosion resistant coating; and a rubber adherent metallic coating on said barrier coating of the group consisting of copper, copper-zinc alloys, copper-cadmium alloys, and copper-tin alloys.

4. An article for adherent vulcanization to rubber, comprising: a ferrous metal base; a corrosion resistant coating on said base consisting predominantly of zinc; a thin barrier coating on said corrosion resistant coating of a metal of the group consisting of nickel, cobalt and antimony; and a rubber adherent coating of copper on said barrier coating.

5. An article for adherent vulcanization to rubber, comprising: a ferrous metal base; a corrosion resistant coating on said base consisting predominantly of zinc, a thin barrier coating of nickel on said corrosion resistant coating; and a rubber adherent coating of copper on said nickel.

6. An article for adherent vulcanization to rubber, comprising: a ferrous metal base; a corrosion resistant coating on said base consisting predominantly of zinc; a thin barrier coating of nickel on said corrosion resistant coating; and a rubber adherent coating on said barrier coating consisting of a copper-zinc alloy.

7. An article for adherent vulcanization to rubber, comprising: a ferrous metal base; a corrosion resistant coating on said base consisting predominantly of cadmium; a thin barrier coating on said corrosion resistant coating of a metal of the group consisting of nickel, cobalt and antimony; and a rubber adherent metallic coating on said barrier coating of the group consisting of copper, copper-zinc alloys, copper-cadmium alloys, and copper-tin alloys.

8. An article for adherent vulcanization to rubber, comprising: a ferrous metal base; a corrosion resistant coating on said base consisting predominantly of cadmium; a thin barrier coating of nickel on said corrosion resistant coating; and a rubber adherent metallic coating on said barrier coating of the group consisting of copper, copper-zinc alloys, copper-cadmium alloys, and copper-tin alloys.

9. An article for adherent vulcanization to rubber, comprising: a ferrous metal base; a corrosion resistant coating on said base consisting predominantly of cadmium; a thin barrier coating on said corrosion resistant coating of a metal of the rubber consisting of nickel, cobalt and antimony; and a rubber adherent coating of copper on said barrier coating.

10. An article for adherent vulcanization to rubber, comprising: a ferrous metal base; a corrosion resistant coating on said base consisting predominantly of cadmium; a thin barrier coating of nickel on said corrosion resistant coating; and a rubber adherent copper coating on said barrier coating.

11. An article for adherent vulcanization to rubber, comprising: a ferrous metal base; a corrosion resistant coating on said base consisting predominantly of tin; a thin barrier coating on said corrosion resistant coating of a metal selected from the group consisting of nickel, cobalt and antimony; and a rubber adherent metallic coating on said barrier coating of the group consisting of copper, copper-zinc alloys, copper-cadmium alloys, and copper-tin alloys.

12. An article for adherent vulcanization to rubber, comprising: ferrous metal base; a corrosion resistant coating on said base consisting predominantly of tin; a thin barrier coating of nickel on said corrosion resistant coating; and a rubber adherent metallic coating on said barrier coating of the group consisting of copper, copper-zinc alloys, copper-cadmium alloys, and copper-tin alloys.

13. An article for adherent vulcanization to rubber, comprising: a ferrous metal base; a corrosion resistant coating on said base consisting predominantly of tin; a thin barrier coating on said corrosion resistant coating of a metal of the group consisting of nickel, cobalt and antimony; and a rubber adherent coating of copper on said barrier coating.

14. An article for adherent vulcanization to rubber, comprising: a ferrous metal base; a corrosion resistant coating of tin on said base; a thin barrier coating of nickel on said corrosion resistant coating; and a rubber adherent copper coating on said barrier coating.

15. A rubber coated article, comprising: a ferrous metal base; a corrosion resistant coating on said base including predominantly a metal of the group consisting of zinc, cadmium and tin; a thin barrier coating on said corrosion resistant coating of a metal selected from the group consisting of nickel, cobalt and antimony; a rubber adherent metallic coating on said barrier coating of the group consisting of copper, copper-zinc alloys, copper-cadmium alloys, and copper-tin alloys; and a rubber coating vulcanized thereto.

References Cited in the file of this patent

UNITED STATES PATENTS

| | | |
|---|---|---|
| 1,977,639 | Langdon | Oct. 23, 1934 |
| 2,120,737 | Domm | June 14, 1938 |
| 2,459,172 | Leutkemeyer | Jan. 18, 1949 |
| 2,689,399 | Gray | Sept. 21, 1954 |